United States Patent [19]

Van Sorge

[11] 3,873,628

[45] Mar. 25, 1975

[54] PREPARATION OF ORTHO-ALKYLATED PHENOLS

[75] Inventor: Bernardus J. Van Sorge, Selkirk, N.Y.

[73] Assignee: General Electric Company, Pittsfield, Mass.

[22] Filed: May 12, 1971

[21] Appl. No.: 142,798

Related U.S. Application Data

[63] Continuation-in-part of Ser. No. 717,919, April 1, 1968, abandoned.

[52] U.S. Cl.............. 260/621 R, 252/440, 260/620, 260/624 C, 260/626 R, 260/626 T
[51] Int. Cl............................................. C07c 37/16
[58] Field of Search............ 260/621 R, 624 C, 620; 252/440

[56] References Cited
UNITED STATES PATENTS 3,446,856   5/1969   Hamilton .................... 260/621 R X

FOREIGN PATENTS OR APPLICATIONS 717,588   10/1954   United Kingdom......... 260/624 C Primary Examiner—Bernard Helfin
Assistant Examiner—Norman Morgenstern
Attorney, Agent, or Firm—Morgan, Finnegan, Durham & Pine

[57] ABSTRACT

Ortho-alkylated phenols are prepared by reacting a phenol unsubstituted in at least one ortho position with an alcohol in the presence of a catalyst consisting of a mixture of magnesium oxide and manganese sulfate.

8 Claims, No Drawings

PREPARATION OF ORTHO-ALKYLATED PHENOLS

CROSS-REFERENCE TO RELATED APPLICATIONS

This application is a continuation-in-part of copending United States application Ser. No. 717,919, filed Apr. 1, 1968 now abandoned.

This invention relates to a process for the alkylation of the ortho position of phenols having at least one ortho-hydrogen. More particularly, the invention relates to a method for the orthoalkylation of a phenol by reacting the phenol with an alkyl alcohol in the presence of magnesium oxide impregnated or otherwise mixed with manganese sulfate as a catalyst.

BACKGROUND OF THE INVENTION

In Hamilton, U.S. Pat. No. 3,446,856, assigned to the same assignee as the present application, there is disclosed and claimed a method for methylating the ortho positions of phenol by the vapor phase reaction of a phenol with methanol in the presence of magnesium oxide as the catalyst at a catalyst bed temperature in the range of 475° to 600°C. Under the conditions prescribed in the Hamilton patent the product is selectively ortho-methylated in yields in excess of 95 percent. Thus, the process offers a means for economically converting phenol to ortho-cresol, a useful disinfectant and wood preservative, and for converting both phenol and ortho-cresol to 2,6-xylenol, a monomer which can be polymerized to form poly(2,6-dimethyl-1,4-phenylene)ether, a high performance thermoplastic material.

While the Hamilton process provides an economical synthesis of both 2,6-xylenol and ortho-cresol from phenol, the service life of the magnesium oxide catalyst is relatively short due to the high temperatures at which the reaction is required to take place.

Winkler et al, U.S. Pat. No. 2,448,942, disclose a process for the exhaustive alkylation of phenols with methanol and higher alcohols up to, for example, $C_{16}$-cetyl alcohol. It is disclosed that, although magnesium oxide can be used as a condensation catalyst in such a process, alumina is the preferred catalyst. The Winkler process is not selective for the ortho position however, and is particularly advantageous to the preparation of penta-substituted phenols. It would be desirable, in view of Winkler, to provide a somewhat similar process, but to decrease or eliminate alkylation in the meta and para positions.

Another Hamilton patent, U.S. Pat. No. 3,280,201, discloses that certain refractory solids can be used to fill a heated tube to provide packing for the vapor phase ortho alkylation of cyclohexanone or 2-methylcyclohexanone at 200°–800°C. The reaction will also occur in the absence of packing. The products will be predominantly 2,6-dialkylphenols, with little meta or para substitution. Apart from the fact that the cyclohexanones are expensive starting materials, the solid bed packings of Hamilton comprise a wide variety of operative materials, including carborundum, glasses, stones, clays, and metallic oxides, such as magnesium oxide, manganese sulfate, and the like. There is no suggestion in the Hamilton disclosure of a combination of solid supports into a mixed catalyst or of the use of such a combination to alkylate phenols.

It has now been discovered that if the catalyst consists of magnesium oxide combined with manganese sulfate, the alkylation of the phenolic compound will proceed at a lower temperature and without a reduction in selectivity.

Accordingly, the present invention has as one of its objects the provision of a catalyst which will permit ortho-alkylation of phenol to be carried out at a lower temperature than used in the prior art processes.

Another object of the invention is to provide a stronger magnesium oxide catalyst which will have a service life of many hundreds of hours before needing regeneration or other treatment.

Still another object is to provide a treated magnesium oxide catalyst which will enable phenols to be ortho-alkylated at temperatures of at least about 420°C. with no reduction in orthoselectivity of the catalyst.

DESCRIPTION OF THE INVENTION

In one aspect the objects of the invention are accomplished by impregnating or otherwise mixing magnesium oxide catalyst material with manganese sulfate and reacting a phenol compound having at least one ortho-hydrogen with an alkyl alcohol in the vapor phase in contact with the catalyst. The present invention contemplates an ortho-alkylation catalyst consisting of magnesium oxide mixed with manganese sulfate, which permits the ortho-alkylation reaction to proceed with a high degree of selectivity and with a reduced induction period for maximum selectivity. Moreover, the new catalyst may be molded to any desired shape and will have strength properties sufficient to prevent particles of the catalyst from breaking or flaking off in operation or handling, thus substantially extending the service life of the catalyst with a minimum of loss during operation. In addition the optimum reaction temperature may be reduced from 500°–540°C. for conventional catalysts down to 420°–485°C., thereby improving the overall economy of the process and increasing the catalyst life further.

According to this invention ortho-alkylated phenols are formed by a process which comprises vapor-phase reaction of an alkyl alcohol, e.g., a saturated aliphatic alcohol such as methyl, ethyl, propyl, isopropyl, butyl, isobutyl, ter.-butyl, amyl, isoamyl, hexyl, heptyl, octyl, nonyl, decyl, undecyl, lauryl, cetyl, cyclohexyl, and the like, alcohols, and especially preferably an alcohol containing up to 6 carbon atoms and most preferably methanol, and a phenol having at least one unsubstituted ortho position, in the presence of the catalyst of this invention at a temperature of at least 420°C., and preferably at a temperature varying between 460°C. and 500°C., and especially preferably at 465°C.–485°C. In general, the process conditions are similar to those disclosed in the above-noted Hamilton patent, but differ therefrom primarily in the substitution of the catalyst of this invention and by use of a lower reaction temperature.

While the invention has been described as applying specifically to phenols and ortho-cresol, it may be applied in general to any phenol having an ortho-hydrogen. For example, it also may be used with ortho-phenyl phenol, ortho-ethyl phenol, and phenols in which there are alkyl and aryl groups in the meta- and para-positions. These phenols may be represented by the formula:

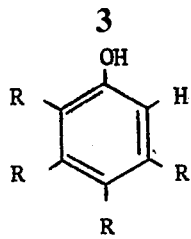

where each R is a monovalent substituent selected from the group consisting of hydrogen, alkyl, e.g., $C_1$–$C_{12}$ alkyl, phenyl and alkyl-substituted phenyl, e.g., $C_1$–$C_{12}$ alkyl-substituted phenyl.

The magnesium oxide used as catalyst in this invention is a material having a very high surface to weight ratio. Magnesium oxides having the desired porosity may be prepared by thermally decomposing magnesium carbonate, basic magnesium carbonate, and magnesium hydroxide as these materials may be converted to magnesium oxide without fusing or sintering on heating.

The magnesium oxides suitable for use in this invention are also available commercially. Illustrative of such materials are magnesium oxides from Davison Chemical Div., W. R. Grace & Co., Baltimore, Md.; Girdler Chemical Div., USM Corp., E. Rutherford, N.J.; and Harshaw Chemical Company, Cleveland, Ohio.

An especially suitable component for use in preparing the instant catalysts is the magnesium oxide designated MgO-0601T by the Harshaw Company. A typical analysis of this material shows the following weight percentages of ingredients: $SiO_2$, 0.32 percent; $Fe_2O_3$, 0.022 percent; CaO, 0.33 percent; $Al_2O_3$, 0.21 percent; water 0.6 percent; and MgO, balance. These values are merely illustrative — and not limiting — many other magnesium oxides, having at least 95 percent by weight of MgO, have been substituted for Harshaw 0601T with substantially similar results.

In preparing the present catalyst, the magnesium oxide is pulverized and mixed with manganese sulfate or it may be impregnated with manganese sulfate by immersing the magnesium oxide in an aqueous solution of manganese sulfate. The interaction between the manganese sulfate and the magnesium oxide upon wet mixing or impregnation is accompanied by the evolution of heat and since the surface to weight ratio of the magnesium oxide is very high, for example, of the order of 180 square meters per gram, the heat developed brings about a noticeable increase in solution temperature under normal impregnation or mixing conditions.

According to a preferred aspect of this invention, the catalysts are provided by mixing magnesium oxide with manganese sulfate, preferably in the form of finely divided powders. Preferably, the powders of the magnesium oxide and the manganese sulfate are maintained below an average particle size of 500 microns in diameter. The percentage of manganese sulfate in the blend is preferably maintained low and may be as low as 1 percent by weight on a dry solids basis or as high as 15 percent or more. The especially preferred range, however, varies from 2 to 10 percent by weight. After the powders are blended, water is added to the mixture in an amount sufficient to completely wet it so that the moist mixture may be molded to shape. Typically, one part by weight water is added for each part of the powder blend. The blend is then molded to shape under pressure, dried at about 200°F. and subsequently calcined at an elevated temperature. A calcination temperature of between 300° and 700°F. for a time up to about 3 hours is sufficient, but temperatures as high as 850°F. may be used. As water is evaporated from the catalyst, minute pores form and thereby expose the magnesium oxide increasing the catalyst activity. A surface area of at least 20, and preferably 120 to 200 square meters per gram of catalyst is desirable. The shape of the catalyst may be in the form of pellets, Raschig rings, cylinders, tablets or any other shape known to the art.

In carrying out the alkylation in accordance with this invention, any one or a mixture of phenols having an ortho-hydrogen may be vaporized and passed through a reactor heated to a suitable temperature, e.g., at least 200°C., and preferably at least 420°C. containing the magnesium oxide-manganese sulfate catalyst of the invention. In order to obtain the maximum yield of ortho-alkylated products, at least one mole of the alkyl alcohol and preferably from 1 to 3 moles of the alcohol are used for each ortho position on the phenol to be alkylated. For example, if phenol, which has two-ortho hydrogens per molecule, is to be methylated to produce a maximum yield of 2,6-xylenol, it is desirable to use two to six moles of methanol for each mole of phenol with higher yields being obtained with higher ratios of methanol to phenol.

The vapors issuing from the reactor are condensed and the products separated by conventional methods such as crystallization, distillation, etc. The reaction proceeds at atmospheric pressure but it is obvious that pressures above or below atmospheric may be used.

The selectivity favoring ortho-methylation over meta or para methylation is the same for this magnesium oxide-manganese sulfate catalyst at 420°C. and above. The advantage of operating at temperatures down to about 420°C. lies in the fact that the catalyst life is extended considerably before regeneration or other treatment is needed. Catalysts made according to this invention have operated without reduction in catalytic action for periods in excess of 800 hours.

An additional benefit accruing to the magnesium oxide - manganese sulfate catalyst lies in the increased strength imparted to the catalyst particles by the manganese oxides formed by the reaction between manganese sulfate and magnesium oxide in the presence of water. There is much less tendency for particles of catalyst to flake off in operation or from handling and the service life is thus extended with a minimum of loss of catalyst.

Description of the Preferred Embodiments

In order that those skilled in the art may better understand the invention, the following examples are given by way of illustration and not by way of limitation.

In the examples, the reactor consists of a reservoir containing a solution of alcohol and phenol compound, connected to a metering pump which feeds the reactants through a ¼ inch stainless steel tube into a vertical vaporizer made from a 12-inch long piece of 1 inch O.D. × 0.8 inch I.D. stainless steel tubing. The vaporizer is partially immersed in a bath of fused salt to a depth of about 6 inches. The vapors from the vaporizer are fed to an 0.8 inch I.D. stainless steel tube reactor through a 1 inch length of 0.25 inch I.D. stainless steel pipe located 5.50 inches above the bottom of the vaporizer and connected to the reactor 13 inches from its bottom. The reactor is 24 inches long and is immersed in the fused salt bath to a depth of 14 inches. Since the inlet tube of the reactor coming from the vaporizer also passes through the fused salt bath, it serves as a preheater for the vapor issuing from the vaporizer to bring the vapor up to the temperature of the reactor. The reactor is equipped with a thermowell made from ⅛ inch stainless steel tubing concentrically located in the reactor and extending downwards into the catalyst bed to a depth of 1 to 6 inches. Thus the catalyst bed temperature can be measured throughout a large section of the tube. The reactor tube is filled with about 20 ml. of glass beads and then 100 ml. of catalyst is introduced which fills the tube to a depth of 14 inches. The reactant vapors are fed to the top of the catalyst bed and product vapors leave the bottom of the reactor through a 3/8 inch O.D. stainless steel outlet tube. The product vapors are led to a water-cooled condenser and receiver.

EXAMPLES 1 and 2

A catalyst is prepared by impregnation of 200 grams of magnesium oxide (MgO-0601T, Harshaw Chemical Company, Cleveland, Ohio, >98 percent MgO; balance inert impurities, $SiO_2$; $Fe_2O_3$; CaO; $Al_2O_3$; water, typical anaysis described above) with 22.4 grams of manganese sulfate monohydrate dissolved in 100 milliliters of water. The catalyst is dried by heating to dryness at 80°C. The catalyst is then placed in a reaction chamber maintained at a temperature of about 440°C. The feed composition is vaporized and the vapors passed through the catalyst chamber at the rate indicated. The conditions and results are shown in the following Table I:

TABLE I

|  | Example 2 | Example 1 |
|---|---|---|
| Feed Composition (grams) |  |  |
| Phenol | 1359 | 1359 |
| Ortho-cresol | — | 1561 |
| Methanol | 2311 | 2773 |
| Water | 4185 | 6031 |
| Feed Rate (lbs./hr.) |  |  |
| Phenol | .044 | .073 |
| Ortho-cresol | — | .084 |
| Methanol | .075 | .149 |
| Water | .136 | .325 |
| 2,6-xylenol Produced |  |  |
| Lbs./hr. | .0343 | .0814 |
| Percent by weight | 63.3 | 46 |
| Lbs./hr./cu.ft. catalyst | 9.71 | 23.05 |
| Molar Selectivity |  |  |
| Percent phenol transformed to ortho-cresol and 2,6-xylenol | 95.3 | 91.4 |

The molar selectivity improves with the age of the catalyst and gradually "levels out."

EXAMPLE 3

For comparative purposes and to demonstrate the beneficial effect of combining manganese sulfate with magnesium oxide to improve the prior art catalysts, the following procedures are carried out at the same flow rates and indicated temperatures.

Catalyst A, for control purposes is Harshaw MgO-0601T, 98 percent pure, with an analysis as described in Examples 1 and 2.

Catalyst B, according to this invention, is prepared by impregnation of 200 grams of the same commercial Harshaw MgO catalyst with 22.4 grams of manganese sulfate dihydrate dissolved in 100 ml. of water and freeing from water by heating at 80°C.

The reaction system is as described above. The catalysts are placed in the reaction chamber, which is maintained at the temperatures indicated. The feed composition is vaporized and the vapors are passed through the catalyst chamber at the rate indicated. The composition of the feed and the product composition under the various conditions for the two catalysts are summarized in Table II.

TABLE II

| Run | 3 (control) | 3 |
|---|---|---|
| Catalyst | A | B |
| Type | MgO | MgO/MnSO$_4$ |
| Feed Composition (moles) |  |  |
| PhOH | 1 | 1 |
| MeOH | 5 | 5 |
| H$_2$O | 16.1 | 16.1 |
| Rate* |  |  |
| ml./hr. 168 | 172 |  |
| L.H.S.V. (hr$^{-1}$) | 1.76 | 1.80 |
| V.S.V. (sec$^{-1}$) | 1.10 | 1.11 |
| Average Temp., °C. | 445 | 431 |
| Product Composition |  |  |
| (wt.%) after-hrs. | 44 | 44 |
| PhOH | 99+ | 31.5 |
| o-Cresol | <1 | 34.4 |
| 2,6-xylenol | 0 | 27.2 |
| 2,4,6-mesitol | 0 | 6.9 |

L.H.S.V. - liquid hourly space velocity
V.S.V. - vapor space velocity

The data demonstrate that at substantially the same flow rates, the prior art magnesium oxide catalyst (A) is not effective to produce more than trace amounts of methylation, more than 99 percent by weight of the phenol being recovered unreacted and none of the desired, 2,6-xylenol is produced. In contrast, with the magnesium oxide/manganese sulfate catalyst according to this invention (B), there is obtained a product containing 68.5 percent by weight of methylated products, including 27.2 percent by weight of the desired 2,6-xylenol.

EXAMPLE 4

The procedure of Example 1 is repeated, substituting for the methanol stoichiometrical amounts of the following alkanols: ethyl, propyl, n-butyl, isopropyl, isobutyl, tertiary butyl, n-amyl and n-hexyl. There are obtained, respectively, phenols mono- and di-ortho-substituted with ethyl, propyl, n-butyl, isopropyl, isobutyl, tertiary butyl, n-amyl and n-hexyl groups.

EXAMPLE 5

The procedure of Example 1 is repeated, substituting for the phenol, stoichiometrical amounts of the following phenolic compounds with at least one ortho-hydrogen:
o-cresol;
m-cresol;
p-cresol;
3,5-xylenol; and
2-phenylphenol.
The predominating products are, respectively:
2,6-xylenol;

2,3,6-trimethylphenol;
2,4,6-trimethylphenol;
2,3,4,6-tetramethylphenol; and
038735866 2-methyl-6-phenylphenol.

Similarly, after substituting for phenol the following phenolic compounds:
2,3-xylenol;
2,4-xylenol;
2,5-xylenol;
2,3,4-trimethylphenol;
2,3,5-trimethylphenol;
3,4,5-trimethylphenol;
2,3,4,5-tetramethylphenol;
4-phenylphenol;
2-tolylphenol;
2,4-diphenylphenol;
2,3-diphenylphenol;
2-xylylphenol;
2-mesitylphenol;
2-durylphenol;
4-methyl-2-phenylphenol;
2-tolyl-4-phenylphenol;
2-phenyl-4-tolylphenol; and
3-methyl-5-phenylphenol,
in the procedure of Example 1 there are obtained the corresponding mono-ortho-methylated and di-ortho-methylated phenols, depending on whether one or two of the ortho-positions is unsubstituted in the starting material.

Although the above examples have shown various modifications and variations of the present invention, other modifications and variations are possible in light of the above teachings. It is therefore to be understood that changes may be made in the particular embodiments of the invention described which are within the full intended scope of the invention as defined by the appended claims.

I claim:

1. In a process for alkylating a phenol in the ortho position which comprises the vapor phase reaction in the presence of an alkylation catalyst, an alkyl alcohol and a phenol compound of the formula

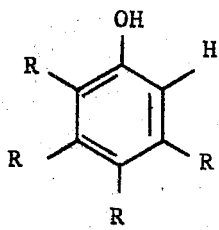

where R is a monovalent substituent from the group consisting of hydrogen, alkyl, phenyl and alkyl substituted phenyl; the improvement comprising conducting the reaction in the presence of a catalyst comprising magnesium oxide in admixture with at least 1 percent by weight of manganese sulfate wherein the catalyst is maintained at a temperature of 420°–485°C.

2. A process as defined in claim 1 wherein said alcohol is methyl alcohol.

3. A process as defined in claim 1 wherein each R in said phenol compound is hydrogen.

4. A process as defined in claim 1 wherein said phenol compound is ortho-cresol.

5. A process as defined in claim 1 wherein said phenol compound is a mixture of phenol and ortho-cresol.

6. A process as defined in claim 1 wherein the manganese sulfate comprises from 1 to 15 percent by weight of the total catalyst.

7. A process as defined in claim 1 wherein the manganese sulfate comprises from 2 to 10 percent by weight of the total catalyst.

8. A process for alkylating a phenol in the ortho position which comprises contacting in the vapor phase a phenol compound of the formula:

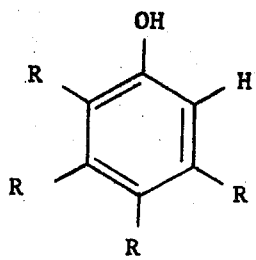

where R is a monovalent substituent from the group consisting of hydrogen, alkyl, phenyl and alkyl substituted phenyl; with an alkyl alcohol in the presence of a catalyst which comprises magnesium oxide and from 1 to 15 percent by weight of manganese sulfate based on the weight of the total catalyst of a temperature of from 460°–500°C.

* * * * *

UNITED STATES PATENT OFFICE
CERTIFICATE OF CORRECTION

PATENT NO. : 3,873,628
DATED : March 25, 1975
INVENTOR(S) : Bernardus J. Van Sorge It is certified that error appears in the above-identified patent and that said Letters Patent are hereby corrected as shown below:

Column 5, Table I, "Example 2" should be -- Example 1 --;

Column 5, Table I, "Example 1" should be -- Example 2 --.

Column 6, Table II, under "Rate*", after "ml./hr." delete "168" and insert -- 168 under column entitled "3 (control)" --;

Column 6, Table II, under the column entitled "3 (control)", delete "172" and insert -- 172 under the column entitled "3" --;

Column 6, Table II, at the bottom of the table, before "L.H.S.V." insert -- * --.

UNITED STATES PATENT OFFICE
CERTIFICATE OF CORRECTION

Patent No. 3,873,628     Dated March 25, 1975

Inventor(s) Bernardus J. Van Sorge     Page - 2

It is certified that error appears in the above-identified patent and that said Letters Patent are hereby corrected as shown below:

Column 7, line 4, delete "038735866".

Signed and Sealed this twenty-second Day of July 1975

[SEAL]

Attest:

RUTH C. MASON  
Attesting Officer

C. MARSHALL DANN  
Commissioner of Patents and Trademarks